(12) United States Patent
Yoshizumi et al.

(10) Patent No.: US 10,886,541 B2
(45) Date of Patent: Jan. 5, 2021

(54) MANUFACTURING METHOD OF TERMINAL PLATE

(71) Applicants: TOYOTA JIDOSHA KABUSHIKI KAISHA, Toyota (JP); AISIN TAKAOKA CO., LTD., Toyota (JP)

(72) Inventors: Tomoo Yoshizumi, Toyota (JP); Hiroya Nakaji, Toyota (JP); Ken Asai, Kariya (JP); Masakazu Suzuki, Toyota (JP)

(73) Assignees: Toyota Jidosha Kabushiki Kaisha, Toyota (JP); Aisin Takaoka Co., Ltd., Toyota (JP)

(*) Notice: Subject to any disclaimer, the term of this patent is extended or adjusted under 35 U.S.C. 154(b) by 32 days.

(21) Appl. No.: 16/014,191

(22) Filed: Jun. 21, 2018

(65) Prior Publication Data
US 2018/0375111 A1    Dec. 27, 2018

(30) Foreign Application Priority Data

Jun. 23, 2017 (JP) ................................ 2017-122714

(51) Int. Cl.
| | |
|---|---|
| *H01M 8/02* | (2016.01) |
| *B23K 20/26* | (2006.01) |
| *H01M 8/2483* | (2016.01) |
| *B23K 20/12* | (2006.01) |
| *H01M 8/0258* | (2016.01) |

(Continued)

(52) U.S. Cl.
CPC ............ *H01M 8/02* (2013.01); *B23K 20/122* (2013.01); *B23K 20/129* (2013.01); *B23K 20/1265* (2013.01); *B23K 20/26* (2013.01); *H01M 8/0258* (2013.01); *H01M 8/2483* (2016.02); *B23K 2101/34* (2018.08); *B23K 2101/36* (2018.08); *B23K 2103/10* (2018.08); *B23K 2103/12* (2018.08)

(58) Field of Classification Search
CPC ............................ B23K 20/1265; H01M 8/02
See application file for complete search history.

(56) References Cited

U.S. PATENT DOCUMENTS

| | | | |
|---|---|---|---|
| 9,287,548 B2 * | 3/2016 | Byun | ............... B23K 20/122 |
| 2002/0179682 A1 | 12/2002 | Schilling et al. | |

(Continued)

FOREIGN PATENT DOCUMENTS

| | | |
|---|---|---|
| CN | 105108315 A | 12/2015 |
| DE | 199 55 737 A1 | 6/2001 |

(Continued)

*Primary Examiner* — Ula C Ruddock
*Assistant Examiner* — Sarika Gupta
(74) *Attorney, Agent, or Firm* — Finnegan, Henderson, Farabow, Garrett & Dunner, LLP

(57) ABSTRACT

There is provided a manufacturing method of a terminal plate including a conductive plate and a terminal that is welded to the conductive plate and that is made of a different material from a material of the conductive plate. This manufacturing method comprises an overlapping process of laying an end portion of the terminal on the conductive plate; a pressing process of pressing part of overlapping surfaces of the conductive plate and the terminal, after the overlapping process; and a welding process of welding at least part of a remaining region excluding the pressed part of the overlapping surfaces, by friction stir welding.

4 Claims, 11 Drawing Sheets

(51) Int. Cl.
   *B23K 103/12*   (2006.01)
   *B23K 103/10*   (2006.01)
   *B23K 101/36*   (2006.01)
   *B23K 101/34*   (2006.01)

(56) References Cited

U.S. PATENT DOCUMENTS

| | | |
|---|---|---|
| 2003/0201306 A1 | 10/2003 | McTernan et al. |
| 2009/0226789 A1* | 9/2009 | Mizusaki et al. |
| 2012/0058411 A1* | 3/2012 | Kobayashi et al. |
| 2016/0111733 A1* | 4/2016 | Shizuku et al. |
| 2016/0118672 A1 | 4/2016 | Shizuku |
| 2016/0325374 A1 | 11/2016 | Hori et al. |

FOREIGN PATENT DOCUMENTS

| | | |
|---|---|---|
| DE | 603 10 020 T2 | 7/2007 |
| JP | 2002-283070 | 10/2002 |
| JP | 2004-031010 A | 1/2004 |
| JP | 2009-212029 | 9/2009 |
| JP | 2015-131321 A | 7/2015 |
| JP | 2016-81666 | 5/2016 |

\* cited by examiner

MANUFACTURING METHOD OF TERMINAL PLATE

CROSS REFERENCE TO RELATED APPLICATIONS

The present application claims the priority based on Japanese Patent Application No. 2017-122714 filed on Jun. 23, 2017, the disclosure of which is hereby incorporated by reference in its entirety.

BACKGROUND

Field

The present disclosure relates to a manufacturing method of a terminal plate.

Related Art

A known configuration of a terminal plate that is used for a fuel cell to collect electricity includes a terminal that is welded to a conductive plate by friction stir welding (hereinafter may be abbreviated as FSW) as described in JP 2009-212029A. FSW is a technique that uses a frictional heat generated in the process of inserting a rotating probe into a workpiece to weld two workpieces to each other.

When the conductive plate and the terminal are made of different materials and have a large difference in linear expansion coefficient, however, a warpage is likely to occur in the conductive plate after the terminal is welded to the conductive plate. There is accordingly a need for a technique that suppresses the occurrence of a warpage in the conductive plate.

SUMMARY

According to one aspect of the present disclosure, there is provided a manufacturing method of a terminal plate. This terminal plate includes a conductive plate and a terminal that is welded to the conductive plate and that is made of a different material from a material of the conductive plate. The manufacturing method comprises an overlapping process of laying an end portion of the terminal on the conductive plate; a pressing process of pressing part of overlapping surfaces of the conductive plate and the terminal, after the overlapping process; and a welding process of welding at least part of a remaining region excluding the pressed part of the overlapping surfaces, by friction stir welding. The manufacturing method of the terminal plate of this aspect performs FSW on the overlapping surfaces in the pressed condition. This configuration suppresses displacement of the overlapping surfaces even when the conductive plate and the terminal have a large difference in linear expansion coefficient. This configuration accordingly suppresses the occurrence of a warpage in the conductive plate.

DETAILED DESCRIPTION

A. First Embodiment

Figure 1:
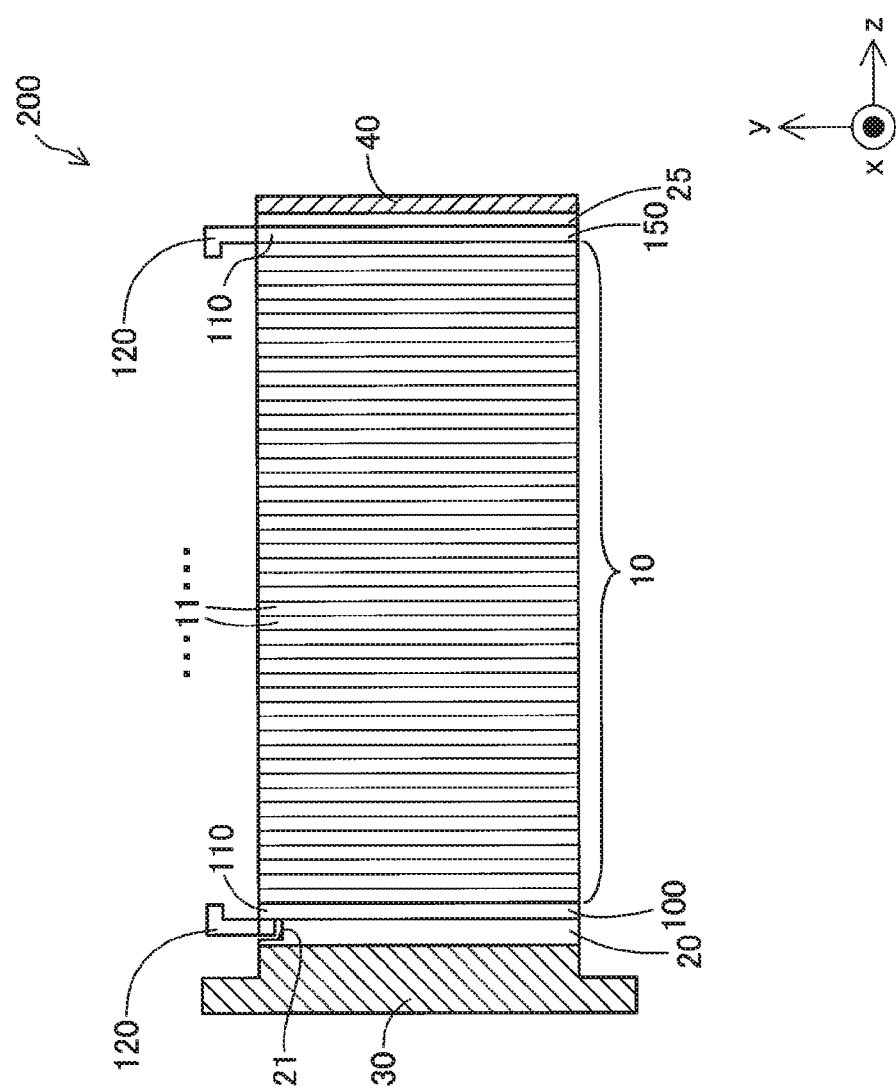
FIG. 1 is a plan view illustrating a fuel cell stack.
Figure 2:
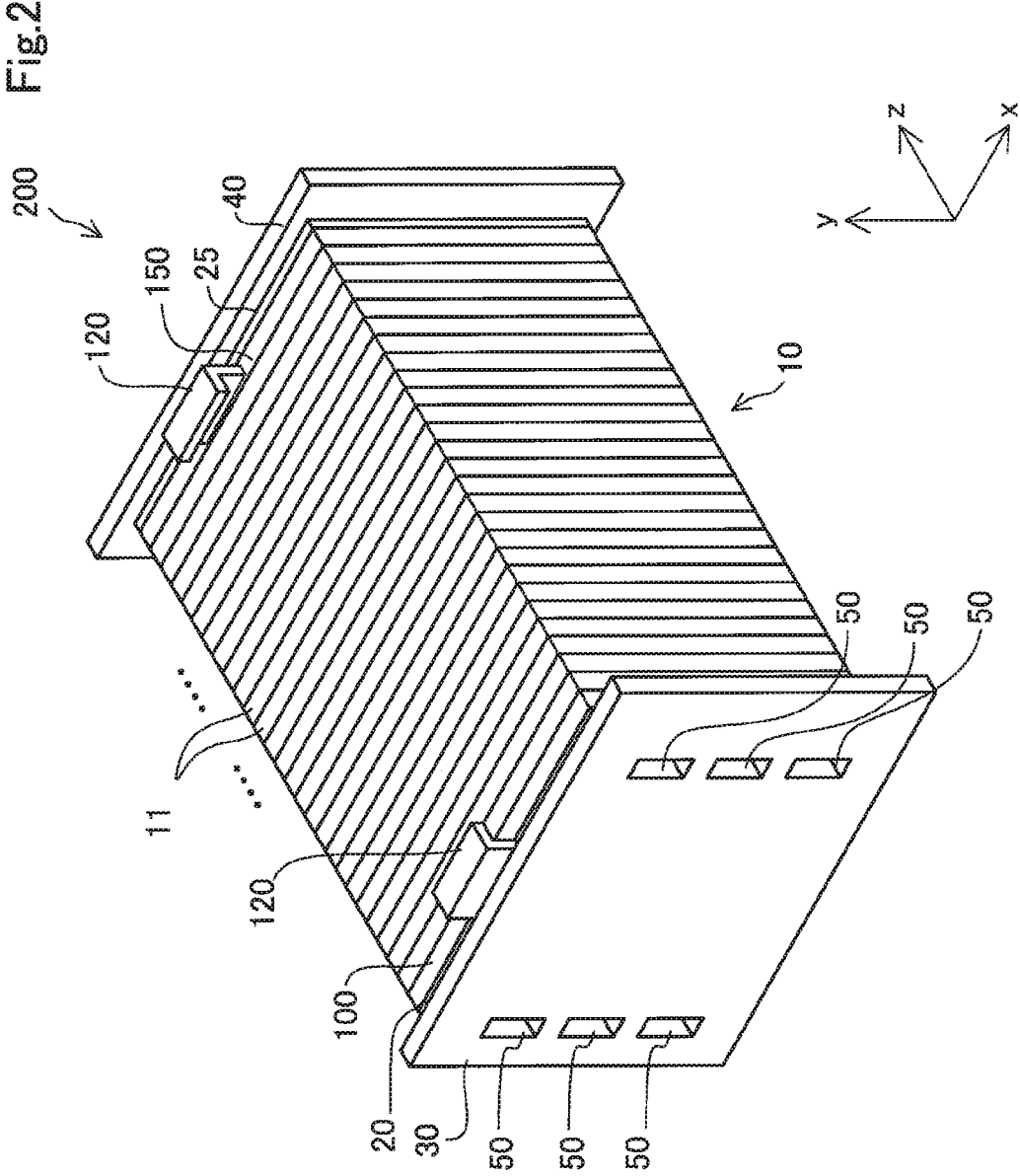
FIG. 2 is a perspective view illustrating the fuel cell stack.

FIG. 1 and FIG. 2 are diagrams schematically illustrating a fuel cell stack 200 using a terminal plate 100 for fuel cell that is manufactured by a manufacturing method of a terminal plate according to an embodiment. FIG. 1 is a plan view illustrating the fuel cell stack 200, and FIG. 2 is a perspective view illustrating the fuel cell stack 200. The fuel cell stack 200 is a polymer electrolyte fuel cell. The fuel cell stack 200 includes a stacked body 10 of a plurality of fuel cell units 11, a pair of terminal plates 100 and 150, a pair of insulating plates 20 and 25, an end plate 30, a pressure plate 40, and manifolds 50.

The terminal plates 100 and 150 are placed at respective ends of the stacked body 10 in a stacking direction (z-axis direction). The respective ends of the stacked body 10 in the stacking direction are placed between the end plate 30 and the pressure plate 40. The insulating plates 20 and 25 are respectively placed between the terminal plate 100 and the end plate 30 and between the terminal plate 150 and the pressure plate 40. The terminal plates 100 and 150, the insulating plates 20 and 25, the end plate 30 and the pressure plate 40 are all plate-like members.

The terminal plates 100 and 150 are members used to take out power from the stacked boy 10. The terminal plate 100 includes a conductive plate 110 and a terminal 120 welded to the conductive plate 110. The detailed configurations of the terminal plates 100 and 150 will be described later.

The insulating plates 20 and 25 are members configured to insulate the stacked body 10 from other members (for example, the end plate 30 and a vehicle body (not shown) with the fuel cell stack 200 mounted thereon). The end plate 30 and the pressure plate 40 are members configured to apply pressures from the respective ends of the stacked body 10 in the stacking direction (z-axis direction), such that a desired surface pressure is applied to the stacked body 10. Respective surfaces of the insulating plates 20 and 25, the end plate 30 and the pressure plate 40 that are in contact with the stacked body 10 have outer shapes that are formed to be approximately corresponding to the outer shape of the stacked body 10 in a planar direction (direction of a plane perpendicular to the stacking direction (xy direction)).

A cut 21 is formed at a location corresponding to the position of the terminal 120 of the insulating plate 20 in such a shape that corresponds to the shape of the terminal 120. The terminal 120 is placed in the cut 21 when the insulating plate 20 is layered on the terminal plate 100.

The manifolds 50 are formed by aligning through holes, which are respectively formed in the respective fuel cell units 11, the terminal plate 100, the insulating plate 20 and the end plate 30, in the stacking direction of the stacked body 10 (z-axis direction). Each of the manifolds 50 is provided to allow for the flow of a reactive gas or cooling water.

Figure 3:
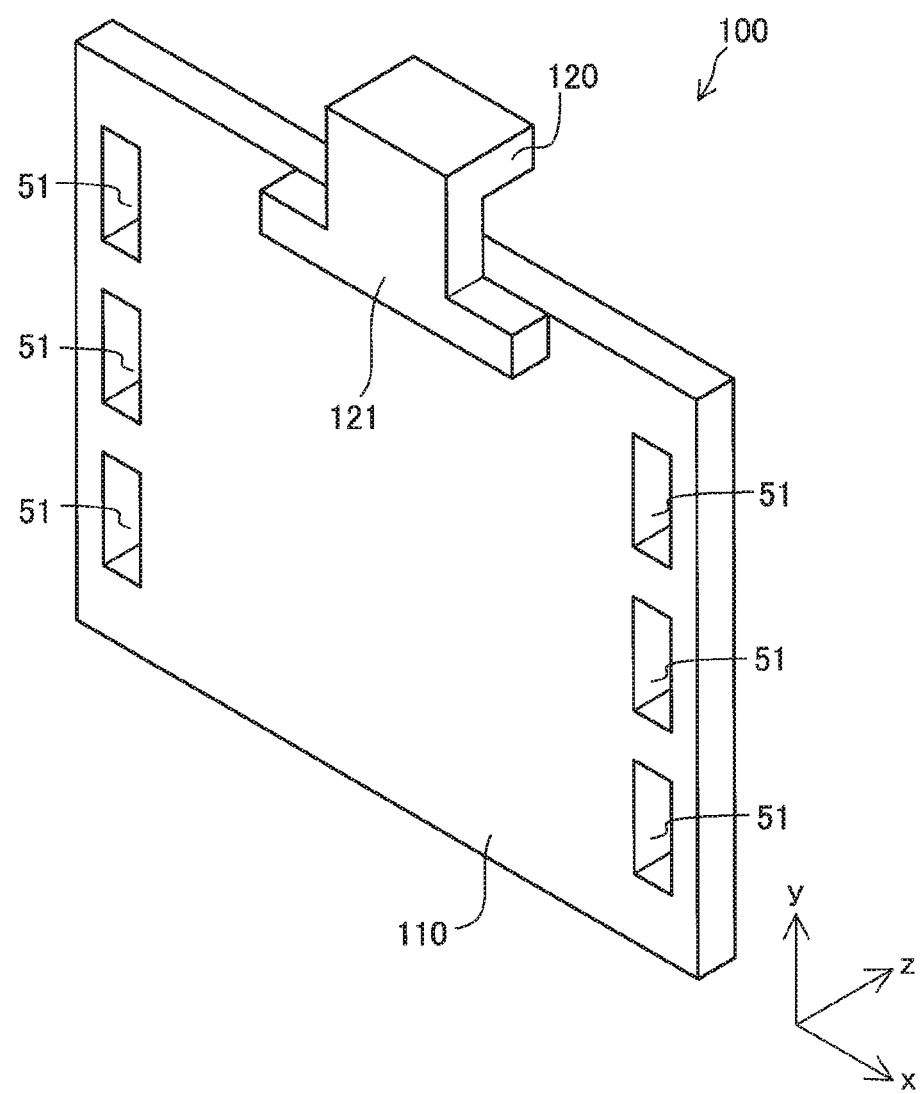
FIG. 3 is a diagram illustrating the schematic configuration of a terminal plate.

FIG. 3 is a diagram illustrating the schematic configuration of the terminal plate 100. According to the embodiment, the terminal 120 has an end portion 121 that is welded in an overlapping manner to an upper periphery (on a +y-axis direction side) of a surface of the conductive plate 110 opposite to the stacked body 10 (on a −z-axis direction side) and has a protruded portion that is protruded in the planar direction (more specifically, +y-axis direction according to the embodiment) perpendicular to the stacking direction (z-axis direction). According to the embodiment, a +y-axis direction-side leading end of the protruded portion of the terminal 120 that is protruded from the conductive plate 110 is folded in a +z-axis direction. The protruded portion of the terminal 120 that is protruded from the conductive plate 110 has a smaller width (i.e., smaller length in an x-axis direction) than the width of the end portion 121. The conductive plate 110 includes through holes 51 that are provided to form the respective manifolds 50.

The conductive plate 110 and the terminal 120 are made of different materials. According to the embodiment, the conductive plate 110 is made of titanium. The terminal 120 is made of aluminum. Another example used as the material of the conductive plate 110 may be gold-plated copper. Other examples used as the material of the terminal 120 may be copper and silver-plated aluminum. The linear expansion coefficient of titanium (8.9 μm/m·° C.) used as the material of the conductive plate 110 is approximately one third the linear expansion coefficient of aluminum (23.5 μm/m·° C.) used as the material of the terminal 120. Accordingly, a warpage is likely to occur in the plane of the conductive plate 110 when the conductive plate 110 welded to the terminal 120 is cooled down.

Figure 4:
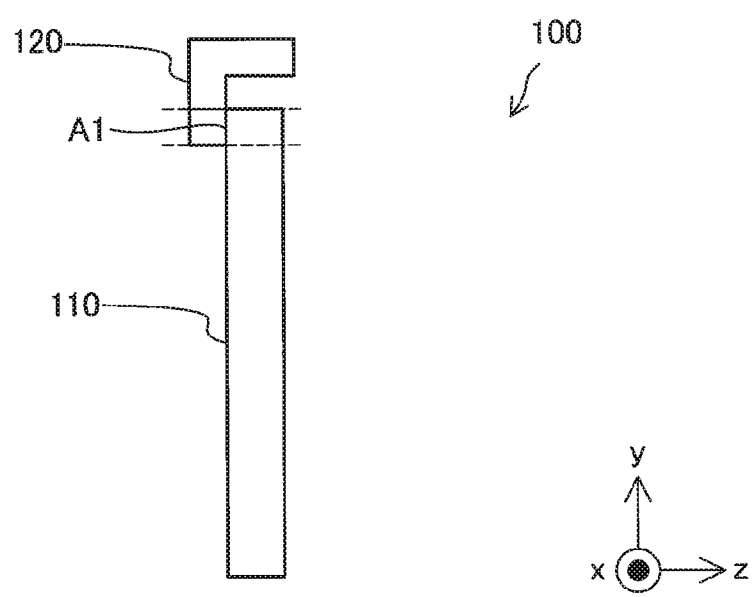
FIG. 4 is a side view illustrating the schematic configuration of the terminal plate.

FIG. 4 is a side view illustrating the schematic configuration of the terminal plate 100. FIG. 4 illustrates the terminal plate 100 viewed from a +x-axis direction. A region A1 shown in FIG. 4 indicates overlapping surfaces of the conductive plate 110 and the terminal 120. According to the embodiment, the "overlapping surfaces" denote surfaces of the conductive plate 110 and the terminal 120 that overlap with each other.

Figure 5:
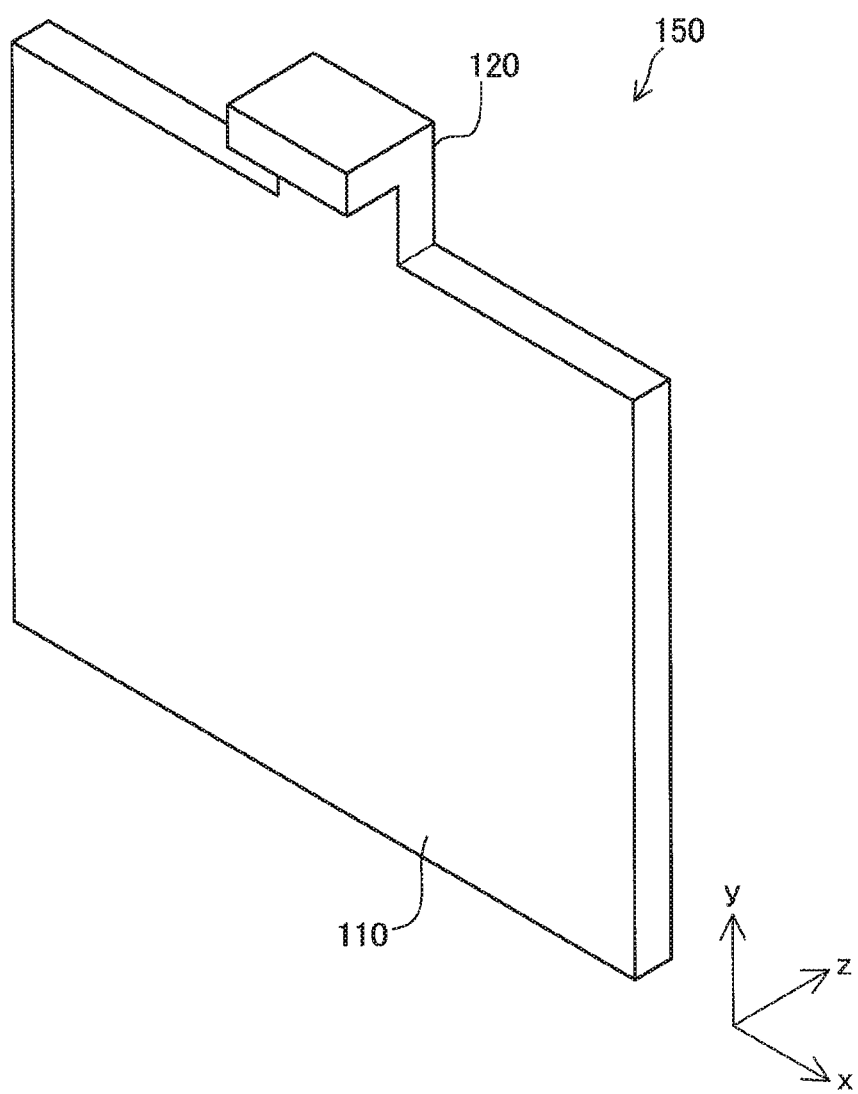
FIG. 5 is a diagram illustrating the schematic configuration of another terminal plate.

FIG. 5 is a diagram illustrating the schematic configuration of the terminal plate 150. According to the embodiment, the terminal plate 150 includes a terminal 120 that is integrally formed with a conductive plate 110. A +y-axis direction-side leading end of the terminal 120 is folded in the −z-axis direction. The terminal plate 150 may be entirely made of, for example, aluminum. The terminal plate 150 has no through holes 51, while the terminal plate 100 has the through holes 51. According to a modification, like the terminal plate 100, the terminal plate 150 may be configured such that a separate terminal is welded in an overlapping manner to the conductive plate 110.

Figure 6:
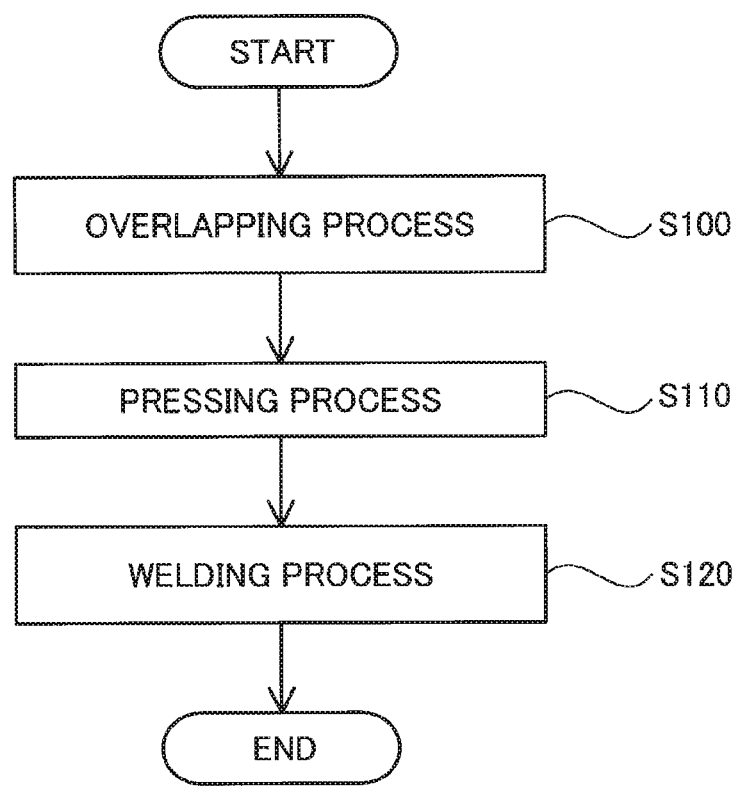
FIG. 6 is a flowchart showing a manufacturing method of the terminal plate.

FIG. 6 is a flowchart showing a manufacturing method of the terminal plate 100 according to the embodiment. A first process of the manufacturing method is an overlapping process (step S100). The overlapping process lays the end portion 121 of the terminal 120 on the conductive plate 110. A second process is a pressing process (step S110). The pressing process presses part of the overlapping surfaces of the conductive plate 110 and the terminal 120. According to the embodiment, the pressing process uses a jig to press part of the region A1 as the overlapping surfaces.

Figure 7:
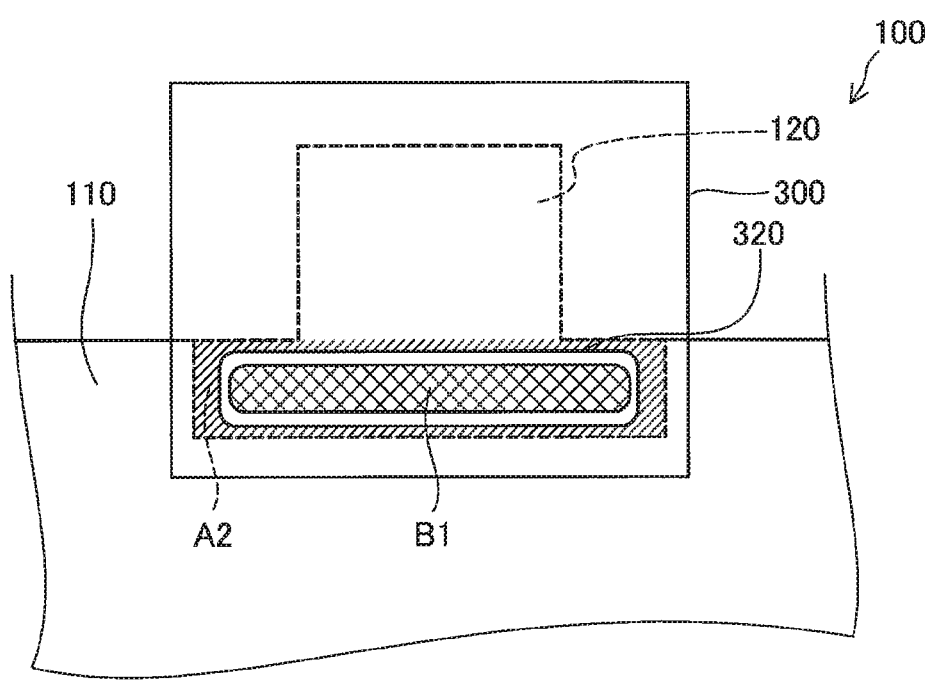
FIG. 7 is a plan view illustrating the terminal plate in a pressing process.
Figure 8:
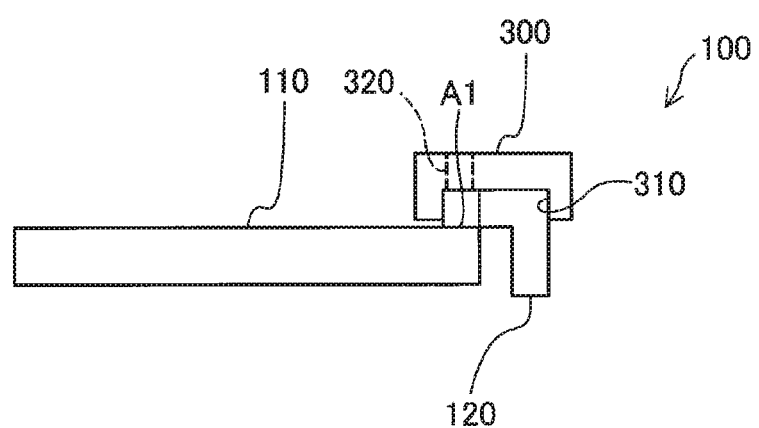
FIG. 8 is a side view illustrating the terminal plate in the pressing process.

FIGS. 7 and 8 are diagrams illustrating the pressing process using a jig 300. FIG. 7 is a plan view illustrating the terminal plate 100 in the pressing process. FIG. 8 is a side view illustrating the terminal plate 100 in the pressing process. According to the embodiment, the jig 300 is a member including a recess 310. The jig 300 is placed on the terminal 120 such that the terminal 120 is received in the recess 310 and is used to press a region A2 that is an outer circumferential part of the region A1 as the overlapping surfaces, via the terminal 120 from an overlapping direction. According to the embodiment, the "overlapping direction" means a direction in which the conductive plate 110 and the terminal 120 are overlapped with each other.

The jig 300 includes an opening 320 at a position corresponding to a welded region B1. According to the embodiment, the "welded region" B1 denotes at least part of a remaining region excluding the pressed part (region A2) of the overlapping surfaces (region A1) that is pressed in the pressing process.

According to the embodiment, the jig 300 applies, for example, a force of approximately 300 N to press the part (region A2) of the overlapping surfaces via the terminal 120. The magnitude of this pressing force may be determined experimentally in advance, for example, such that the in-plane flatness of the terminal plate 100 after manufacture is approximately 0.05.

A last process is a welding process (step S120 in FIG. 6). The welding process welds the welded region B1 (shown in FIG. 7) that is part of the overlapping surfaces of the conductive plate 110 and the terminal 120 pressed in the pressing process (step S110), by friction stir welding (FSW). According to the embodiment, an FSW apparatus configured to perform FSW may has, for example, a shoulder of approximately 10 mm and a probe of approximately 5 mm in diameter. A rotation speed of the probe and other factors, in addition to the dimensions of the shoulder and the probe, may be regulated arbitrarily according to the specification of the FSW and the properties of metal materials used to form the conductive plate 110 and the terminal 120, which are the target of FSW.

The manufacturing method of the terminal plate 100 according to the embodiment described above performs FSW on the overlapping surfaces in the pressed condition. This configuration suppresses displacement of the overlapping surfaces even when the conductive plate 110 and the terminal 120 have a large difference in linear expansion coefficient. This configuration accordingly suppresses the occurrence of a warpage in the conductive plate 110. The manufacturing method of the embodiment uses the jig 300 for the pressing process and accordingly implements the pressing process by the simple configuration.

B. Second Embodiment

A terminal plate manufactured by a manufacturing method of a terminal plate according to a second embodiment has the same configuration as that of the terminal plate 100 (shown in FIG. 3) manufactured by the manufacturing method of the terminal plate according to the first embodiment. The description on the configuration of the terminal plate according to the second embodiment is accordingly omitted. The manufacturing method of the terminal plate according to the second embodiment differs from the manufacturing method of the terminal plate according to the first embodiment by a pressing process and a welding process but is otherwise similar to the manufacturing method of the terminal plate according to the first embodiment. The following describes the pressing process and the welding process, and the description on the other process is omitted.

Figure 9:
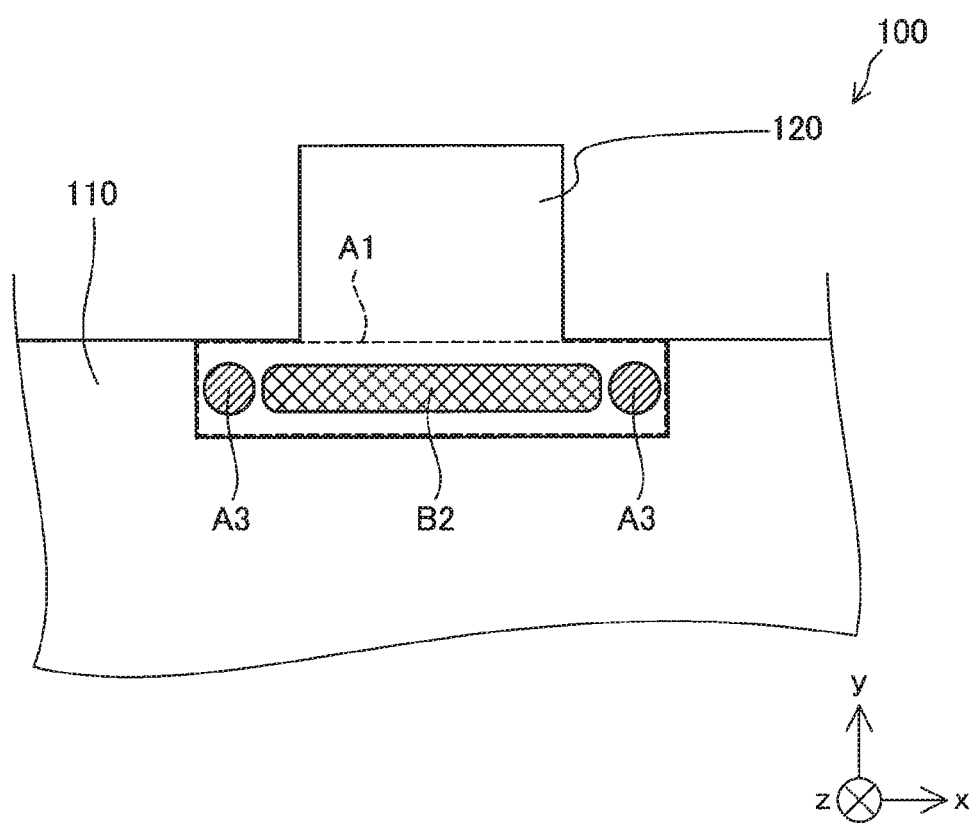
FIG. 9 is a diagram illustrating a pressing process according to a second embodiment.

FIG. 9 is a diagram illustrating the pressing process according to the second embodiment. FIG. 9 is a plan view illustrating the terminal plate 100 in the pressing process. According to the second embodiment, the pressing process welds in advance two positions that are separate from each other in the overlapping surfaces (region A1), by FSW and thereby presses the conductive plate 110 and the terminal 120. More specifically, as shown in FIG. 9, the pressing process presses the conductive plate 110 and the terminal 120 by welding in advance regions A3 on the respective ends of the region A1 by FSW. The welding process welds a welded region B2 that is at least part of a remaining region between the regions A3, by FSW.

The manufacturing method of the terminal plate 100 according to the second embodiment described above performs the pressing process by welding in advance two positions that are separate from each other in the overlapping surfaces by FSW and accordingly implements the pressing process by the simple configuration. The configuration that welds in advance two positions separate from each other in the overlapping surfaces by FSW effectively suppresses the occurrence of a warpage in the conductive plate 110.

C. Third Embodiment

A terminal plate manufactured by a manufacturing method of a terminal plate according to a third embodiment has the same configuration as that of the terminal plate 100 (shown in FIG. 3) manufactured by the manufacturing method of the terminal plate according to the first embodiment. The description on the configuration of the terminal plate according to the third embodiment is accordingly omitted. The manufacturing method of the terminal plate according to the third embodiment differs from the manufacturing method of the terminal plate according to the first embodiment by a pressing process and a welding process but is otherwise similar to the manufacturing method of the terminal plate according to the first embodiment. The following describes the pressing process and the welding process, and the description on the other process is omitted.

Figure 10:
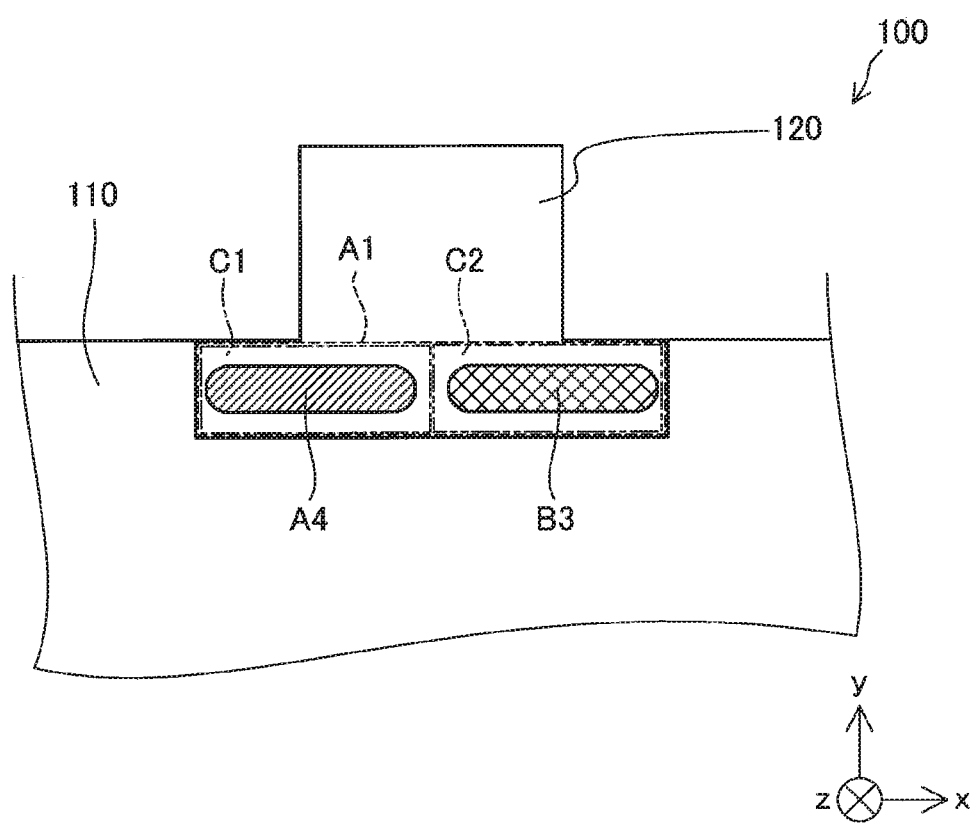
FIG. 10 is a diagram illustrating a pressing process according to a third embodiment.

FIG. 10 is a diagram illustrating the pressing process according to the third embodiment. FIG. 10 is a plan view illustrating the terminal plate 100 in the pressing process. According to the third embodiment, as shown in FIG. 10, the pressing process welds in advance a region A4 that is at least part of one divisional region out of two divisional regions C1 and C2 obtained by dividing the overlapping surfaces (region A1) into two, by FSW and thereby presses the conductive plate 110 and the terminal 120. The welding process welds a welded region B3 that is at least part of the other divisional region C2, by FSW.

The manufacturing method of the terminal plate 100 according to the third embodiment described above performs the pressing process by welding in advance the region A4 that is part of the divisional region C1 out of the two divisional regions of the overlapping surfaces, by FSW and accordingly implements the pressing process by the simple configuration. This configuration also reduces a region that is deformed by one FSW operation and thus effectively suppresses the occurrence of a warpage in the conductive plate 110.

D. Fourth Embodiment

A terminal plate manufactured by a manufacturing method of a terminal plate according to a fourth embodiment has the same configuration as that of the terminal plate 100 (shown in FIG. 3) manufactured by the manufacturing method of the terminal plate according to the first embodiment. The description on the configuration of the terminal plate according to the fourth embodiment is accordingly omitted. The manufacturing method of the terminal plate according to the fourth embodiment differs from the manufacturing method of the terminal plate according to the first embodiment by a pressing process and a welding process but is otherwise similar to the manufacturing method of the terminal plate according to the first embodiment. The following describes the pressing process and the welding process, and the description on the other process is omitted.

Figure 11:
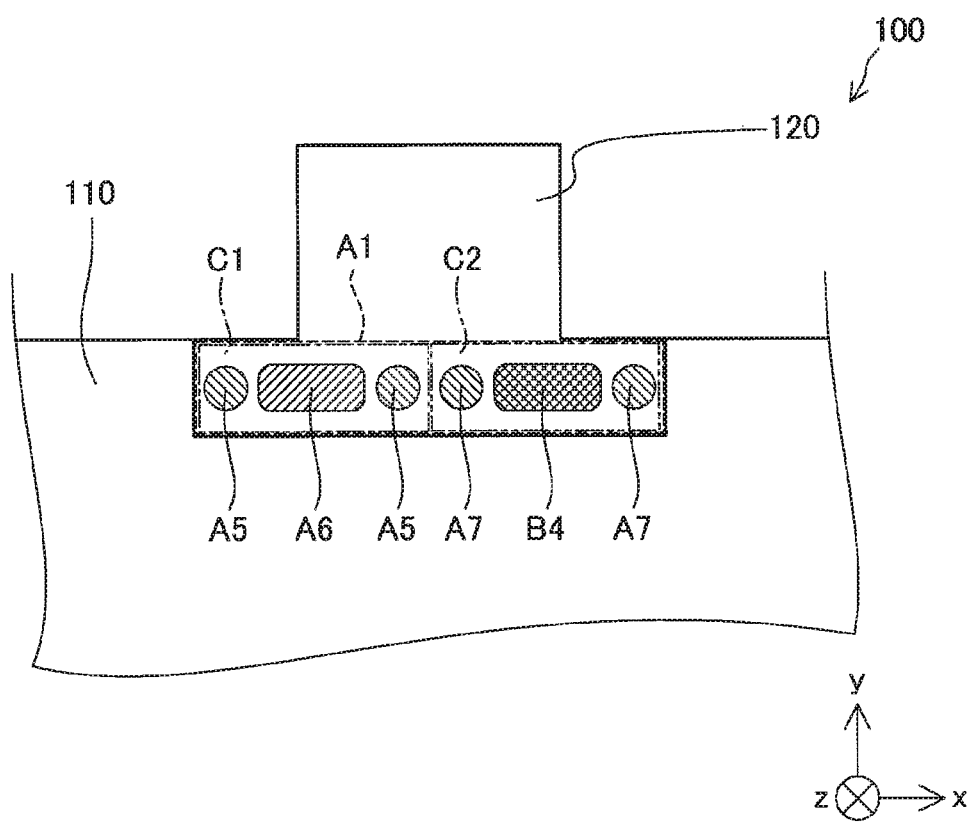
FIG. 11 is a diagram illustrating a pressing process according to a fourth embodiment.

FIG. 11 is a diagram illustrating the pressing process according to the fourth embodiment. FIG. 11 is a plan view illustrating the terminal plate 100 in the pressing process. According to the fourth embodiment, as shown in FIG. 11, the pressing process welds in advance regions A5 that are two positions separate from each other in one divisional region C1 out of two divisional regions C1 and C2 obtained by dividing the overlapping surfaces (region A1) into two, and a region A6 that is part of the divisional region C1 and that is part of a middle region between the regions A5, by FSW and thereby presses the conductive plate 110 and the terminal 120.

More specifically, the pressing process welds in advance the regions A5 at the respective ends in the divisional region C1 by FSW and subsequently welds in advance the region A6 that is between the regions A5 by FSW. The welding process welds regions A7 at the respective ends in the other divisional region C2, by FSW and subsequently welds a welded region B4 that is part of a middle region between the regions A7, by FSW.

The manufacturing method of the terminal plate 100 according to the fourth embodiment described above divides the overlapping surfaces into two like the third embodiment and performs FSW with regard to each divisional region by the same method as that of the second embodiment. This configuration thus more effectively suppresses the occurrence of a warpage in the conductive plate 110.

E. Other Embodiments

In the embodiments described above, FSW is performed from the terminal 120-side in the pressing process and in the welding process. A modification may perform FSW from the conductive plate 110-side.

The configuration of the first embodiment described above may be combined with the configuration of any of the second embodiment, the third embodiment and the fourth embodiment described above. More specifically, the jig 300 of the first embodiment may be used to press part of the overlapping surfaces of the conductive plate 110 and the terminal 120 from the overlapping direction, while performing FSW in the pressing process and in the welding process.

In the third embodiment and the fourth embodiment described above, the pressing process is performed by dividing the overlapping surfaces into two. A modification may perform the pressing process by dividing the overlapping surfaces into three or more. In this modification, the pressing process may press the conductive plate 110 and the terminal 120 by welding in advance part of one divisional region out of three or more divisional regions by FSW or may press the conductive plate 110 and the terminal 120 by welding in advance respective parts of two or more divisional regions by FSW.

The above embodiments describe the manufacturing method of the terminal plate for fuel cell. The present disclosure is, however, not limited to the terminal plate for fuel cell but is also applicable to a manufacturing method of any terminal plate that is used to collect electric power of various cells connected in series or connected in parallel.

The disclosure is not limited to the embodiment described above but may be implemented by a diversity of other configurations without departing from the scope of the disclosure. For example, the technical features of the above embodiment may be replaced or combined appropriately, in order to solve the problem described above or in order to achieve part or all of the advantageous effects described above. Any of the technical features may be omitted appropriately unless the technical feature is described as essential herein. The present disclosure may be implemented by aspects described below.

(1) According to one aspect of the present disclosure, there is provided a manufacturing method of a terminal plate. This terminal plate includes a conductive plate and a terminal that is welded to the conductive plate and that is made of a different material from a material of the conductive plate. The manufacturing method comprises an overlapping process of laying an end portion of the terminal on the conductive plate; a pressing process of pressing part of overlapping surfaces of the conductive plate and the terminal, after the overlapping process; and a welding process of welding at least part of a remaining region excluding the pressed part of the overlapping surfaces, by friction stir welding. The manufacturing method of the terminal plate of this aspect performs FSW on the overlapping surfaces in the pressed condition. This configuration suppresses displacement of the overlapping surfaces even when the conductive plate and the terminal have a large difference in linear expansion coefficient. This configuration accordingly suppresses the occurrence of a warpage in the conductive plate.

In the manufacturing method of the terminal plate of the above aspect, the pressing process may use a jig to press the part of the overlapping surfaces from an overlapping direction. The manufacturing method of the terminal plate of this aspect implements the pressing process by the simple configuration.

(3) In the manufacturing method of the terminal plate of the above aspect, the pressing process may press the part of the overlapping surfaces by welding in advance two positions separate from each other in the overlapping surfaces, by friction stir welding. The manufacturing method of the terminal plate of this aspect implements the pressing process by the simple configuration. This configuration also effectively suppresses the occurrence of a warpage in the conductive plate.

(4) In the manufacturing method of the terminal plate of the above aspect, the pressing process may press the part of the overlapping surfaces by welding in advance at least part of at least one divisional region out of two or more divisional regions obtained by dividing the overlapping surfaces into two or more, by friction stir welding. The manufacturing method of the terminal plate of this aspect implements the pressing process by the simple configuration. This configuration also reduces a region that is deformed by one FSW operation and thus effectively suppresses the occurrence of a warpage in the conductive plate.

The present disclosure may be implemented by various aspects other than the aspects of the manufacturing method of the terminal plate described above, for example, a terminal plate manufactured by the manufacturing method of any of the above aspects or a fuel cell or a fuel cell system including such a terminal plate.

What is claimed is:

1. A method of manufacturing a terminal plate, the terminal plate including a conductive plate and a terminal that is made of a different material from a material of the conductive plate, wherein the terminal includes an end portion that is welded to the conductive plate and a protruded portion that protrudes from the conductive plate, the method comprising:
    an overlapping process of laying the end portion of the terminal on the conductive plate such that the protruded portion is protruded from the conductive plate in a direction parallel to a plane of the conductive plate, wherein overlapping surfaces of the conductive plate and the end portion of the terminal include a first region and a second region that is separate from the first region;
    a pressing process of pressing the first region of the overlapping surfaces after the overlapping process; and
    a welding process of welding the second region of the overlapping surfaces without welding the pressed first region of the overlapping surfaces, by friction stir welding.

2. The method according to claim 1,
wherein the pressing process uses a jig to press the first region of the overlapping surfaces from an overlapping direction.

3. The method according to claim 1,
wherein prior to the welding process, the pressing process presses the first region of the overlapping surfaces by welding two positions along the overlapping surfaces by friction stir welding, the two positions being separate from each other.

4. The method according to claim 1,
wherein prior to the welding process, the pressing process presses the first region of the overlapping surfaces by welding at least part of at least one divisional region out of two or more divisional regions obtained by dividing the overlapping surfaces into two or more divisional regions, by friction stir welding.

* * * * *